UNITED STATES PATENT OFFICE.

GADIENT ENGI, OF BASEL, SWITZERLAND, ASSIGNOR TO SOCIETY OF CHEMICAL INDUSTRY IN BASLE, OF BASEL, SWITZERLAND.

PROCESS OF MAKING FAST-GRAY PRINTS, &c.

954,273.  Specification of Letters Patent.  Patented Apr. 5, 1910.

No Drawing.   Application filed September 20, 1909.  Serial No. 518,494.

*To all whom it may concern:*

Be it known that I, GADIENT ENGI, a citizen of the Swiss Republic, and resident of Basel, Switzerland, have invented a new and useful Process for Obtaining Fast-Gray Prints and Vat Dyeings, of which the following is a full, complete, and exact specification.

According to the United States Letters Patent No. 848356 dated March 26, 1907, vat dyestuffs, which dye vegetable and animal fibers violet to blue tints, are obtained by treating with halogen the dyestuff of the constitution

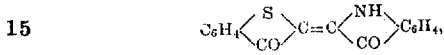

resulting from the condensation of equal molecular proportions of 3-oxy-1-thionaphthene and alpha-isatin-anilid or alpha-isatin-chlorid. I have now found that certain of these dyestuffs, namely the mono-halogen derivatives, are also applicable for producing valuable gray tints. For this purpose, the direct blue prints and vat dyeings obtained by means of such mono-halogen derivatives are treated with hot baths, as for instance hot water, with or without addition of soap, alkali, acid, a neutral or an acid salt, or even a bichromate, according to the nature of the fiber (cotton or wool); the blue color of the prints and dyeings becomes a pure greenish-gray, which is distinguished by its admirable fastness to washing, light and chlorin. The gray tints produced on wool are quite fast to milling. Moreover, these gray dyeings have the remarkable advantage that in artificial light they appear greenish.

The following example illustrates the invention: 20 kilos of cotton yarn, which have been dyed in the usual manner in a hydrosulfite vat containing 2 grams of a monobromo derivative or a monochlor derivative of the dyestuff of the constitution

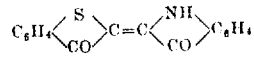

per liter, are oxidized by exposure to air, washed with cold water and then treated for half an hour at 90° C. with water or a soda and soap solution, containing, say, 5 grams of soda and 5 grams of soap per liter. The goods are then washed and dried.

The process is the same, when printed goods are to be treated.

The same result may obviously be attained if, instead of the mono-halogen substitution products obtained by directly halogenizing the condensation products of oxythionaphthene and alpha-isatin-anilid or alpha-isatin-chlorid, there are used the dyestuffs made synthetically, that is to say, by condensing mono-halogen derivatives of alpha-isatin-anilid or alpha-isatin-chlorid with oxythionaphthene.

If the dyestuffs in question are used in combination with other suitable vat dyestuffs, such as cibaheliotrope (tetrabromindirubin), any desired gray tints are obtainable of absolute fastness by the foregoing procedure.

I claim:—

The herein described process for obtaining fast gray prints and vat dyeings, which consists in dyeing or printing fabrics with mono-halogen derivatives of the dyestuff of the constitution

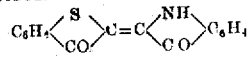

and subjecting said fabrics to a hot bath.

In witness whereof, I have hereunto signed my name in the presence of two subscribing witnesses.

GADIENT ENGI.

Witnesses:
 GEO. GIFFORD,
 AMAND RITTER.